(12) United States Patent
Zhang et al.

(10) Patent No.: US 11,908,352 B2
(45) Date of Patent: Feb. 20, 2024

(54) SPLICED DISPLAY SCREENS

(71) Applicant: BOE Technology Group Co., Ltd., Beijing (CN)

(72) Inventors: Yao Zhang, Beijing (CN); Jinghua Yang, Beijing (CN); Ran Tao, Beijing (CN); Yunpeng Wu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 357 days.

(21) Appl. No.: 17/383,957

(22) Filed: Jul. 23, 2021

(65) Prior Publication Data

US 2022/0165184 A1    May 26, 2022

(30) Foreign Application Priority Data

Nov. 26, 2020 (CN) .......................... 202022783544.3

(51) Int. Cl.
| | | |
|---|---|---|
| *G06F 1/16* | (2006.01) | |
| *G09F 9/302* | (2006.01) | |
| *F16M 13/00* | (2006.01) | |

(52) U.S. Cl.
CPC ......... *G09F 9/3026* (2013.01); *F16M 13/005* (2013.01); *G06F 1/1654* (2013.01)

(58) Field of Classification Search
CPC .... G06F 3/1446; G06F 1/1632; G06F 1/1654; G06F 1/1679; G06F 3/147
See application file for complete search history.

(56) References Cited

U.S. PATENT DOCUMENTS

| | | | | |
|---|---|---|---|---|
| 9,151,060 | B2* | 10/2015 | Khongbantabam | ........................ E04F 13/0894 |
| 9,864,561 | B2* | 1/2018 | Hochman | ............... H01R 25/00 |
| 11,054,862 | B2* | 7/2021 | Hillyerd | ................ G06F 1/1632 |
| 2014/0091686 | A1* | 4/2014 | Pegg | ................... H04M 1/0252 312/222 |
| 2014/0375529 | A1* | 12/2014 | Yun | ....................... G06F 1/1652 345/1.3 |
| 2015/0277491 | A1* | 10/2015 | Browning | ............. G06F 1/1632 248/346.03 |
| 2017/0359916 | A1* | 12/2017 | Hochman | ............... G09F 19/22 |
| 2019/0196773 | A1* | 6/2019 | Miles | .................... G06F 3/1446 |
| 2019/0327843 | A1* | 10/2019 | Chang | .................. H05K 5/0247 |
| 2020/0068726 | A1* | 2/2020 | Hwang | ................ H05K 5/0221 |

* cited by examiner

*Primary Examiner* — Abhishek M Rathod
(74) *Attorney, Agent, or Firm* — IPro, PLLC

(57) ABSTRACT

The present disclosure provides a spliced display screen, which includes a plurality of display modules arranged closely and one or more positioning mechanisms installed on each display module, each positioning mechanism includes: a positioning pin and a groove, the one or more positioning pins are clamped in the one or more grooves, the one or more positioning pins and the one or more grooves cooperate to restrict relative movement in the horizontal direction of two adjacent display modules; an elastic structure arranged corresponding to the positioning pin, one end being connected to the display module and the other end being connected to the positioning pin; in response to being subjected to an external force, the one or more positioning pins rotate along a predetermined direction relative to the one or more grooves and leave the one or more grooves; in response to being disengaged from the external force, the one or more positioning pins return to an initial position along a direction opposite to the predetermined direction through the respective elastic structures.

17 Claims, 17 Drawing Sheets

SPLICED DISPLAY SCREENS

CROSS REFERENCE TO RELATED APPLICATIONS

This application claims priority to Chinese Patent Application No. 202022783544.3 entitled "SPLICED DISPLAY SCREENS" filed on Nov. 26, 2020, the entire content of which is incorporated herein by reference.

TECHNICAL FIELD

The present disclosure relates to the field of display technologies and in particular to spliced display screens.

BACKGROUND

At present, with the maturity of small-pitch spliced display screen technology, the distance between a plurality of display modules constituting a spliced display screen is constantly reduced, so as to meet the application demands of different scenarios (such as indoor scenarios).

SUMMARY

The embodiment of the present disclosure provides a spliced display screen, the spliced display screen includes: a plurality of display modules arranged closely, and one or more positioning mechanisms installed on each of the display modules, wherein each of the positioning mechanisms includes: a positioning pin and a groove which are respectively and correspondingly arranged on two ends of the display module along a vertical direction; an elastic structure arranged corresponding to the positioning pin, one end of the elastic structure being connected to the display module and the other end of the elastic structure being connected to the positioning pin; wherein, for any two display modules adjacent along the vertical direction, the one or more positioning pins on one of the two display modules are clamped in the one or more grooves on the other of the two display modules, and the one or more positioning pins and the one or more grooves cooperate to restrict relative movement of the two display modules along a horizontal direction; in response to being subjected to an external force, the one or more positioning pins rotate along a predetermined direction relative to the one or more grooves and leave the one or more grooves; in response to being disengaged from the external force, the one or more positioning pins return to an initial position along a direction opposite to the predetermined direction through the respective elastic structures.

Optionally, for each of the positioning mechanisms, a shape and a size of the groove are matched with those of the positioning pin.

Optionally, for each of the positioning mechanisms, the groove includes a first opening, and one end of the positioning pin of an adjacent positioning mechanism is clamped in the groove through the first opening.

Optionally, the groove further includes a second opening which is communicated with the first opening and opened on a side wall of the groove, and the second opening is arranged behind the positioning pin of the adjacent positioning mechanism along the predetermined direction.

Optionally, an accommodating cavity with one end including a third opening is arranged on the display module, the elastic structure is arranged at a bottom of the accommodating cavity, the positioning pin is partially located in the accommodating cavity through the third opening, and the positioning pin is located above the elastic structure.

Optionally, the positioning pin sequentially includes a first side surface and a second side surface along the predetermined direction, the first side surface and the second side surface are oppositely arranged, and a partial side surface of the first side surface close to one end away from the accommodating cavity is an inclined surface inclined toward the predetermined direction.

Optionally, the accommodating cavity further includes a fourth opening which is communicated with the third opening and opened on a side wall of the accommodating cavity, and the fourth opening is arranged behind the positioning pin along the predetermined direction.

Optionally, one end of the positioning pin located in the accommodating cavity is pivotally connected to a side wall of the accommodating cavity through a rotating shaft.

Optionally, the display module includes a display panel and a bottom shell fixed on a backlight surface of the display panel, the bottom shell includes a first surface and a second surface which are opposite along the vertical direction; and for each of the positioning mechanisms, the groove is arranged on the first surface; the positioning pin and the elastic structure are both arranged on the second surface corresponding to the groove.

Optionally, the display module includes a display panel and a bottom shell fixed on a backlight surface of the display panel, the bottom shell includes a first surface and a second surface which are opposite along the vertical direction; for each of the positioning mechanisms, the groove is arranged on the first surface; the positioning mechanism further includes a fixing block, and the positioning pin and the elastic structure are both arranged in the fixing block; an installation groove is arranged on the second surface, and the fixing block is slidably arranged in the installation groove.

Optionally, the display module includes a display panel and a bottom shell fixed on a backlight surface of the display panel; the positioning mechanism further includes a fixing base which is detachably fixed on a surface of the bottom shell away from the display panel, and the fixing base includes a first end and a second end which are opposite along the vertical direction; the groove is arranged on the first end of the fixing base; the positioning pin and the elastic structure are both arranged on the second end of the fixing base corresponding to the groove.

Optionally, the display module further includes a handle disposed on a surface of the bottom shell away from the display panel.

Optionally, the spliced display screen further includes a support frame and a plurality of attracting assemblies provided on the plurality of display modules respectively, wherein each of the attracting assemblies includes one or more first attracting components and one or more second attracting components; for each of the display modules, the first attracting components are arranged on a surface of the bottom shell of the display module away from the display panel; the second attracting components are arranged on the support frame corresponding to the first attracting components, and the first attracting components and the second attracting components are attracted and coupled to fix the display module on the support frame.

DETAILED DESCRIPTION

Figure 1:
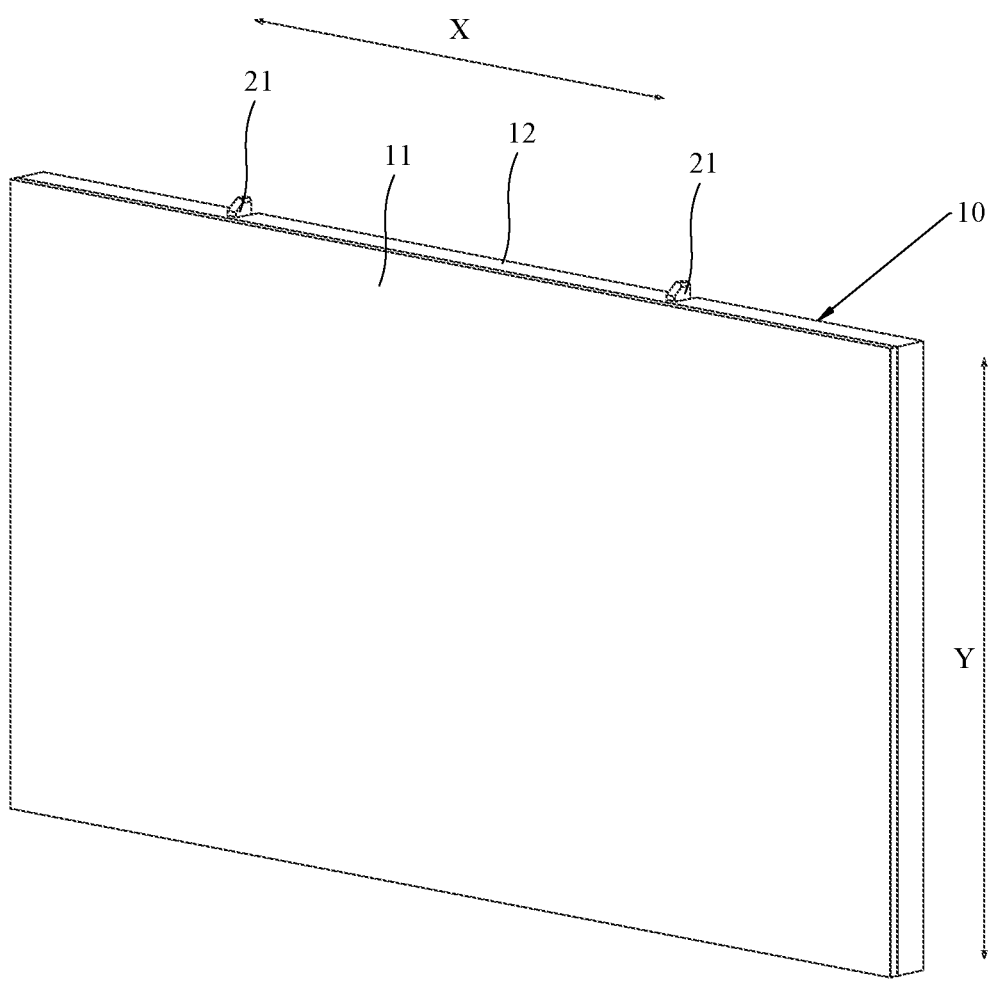
FIG. 1 is a partial perspective view of a structure of a spliced display screen according to an embodiment of the present disclosure.
Figure 2:
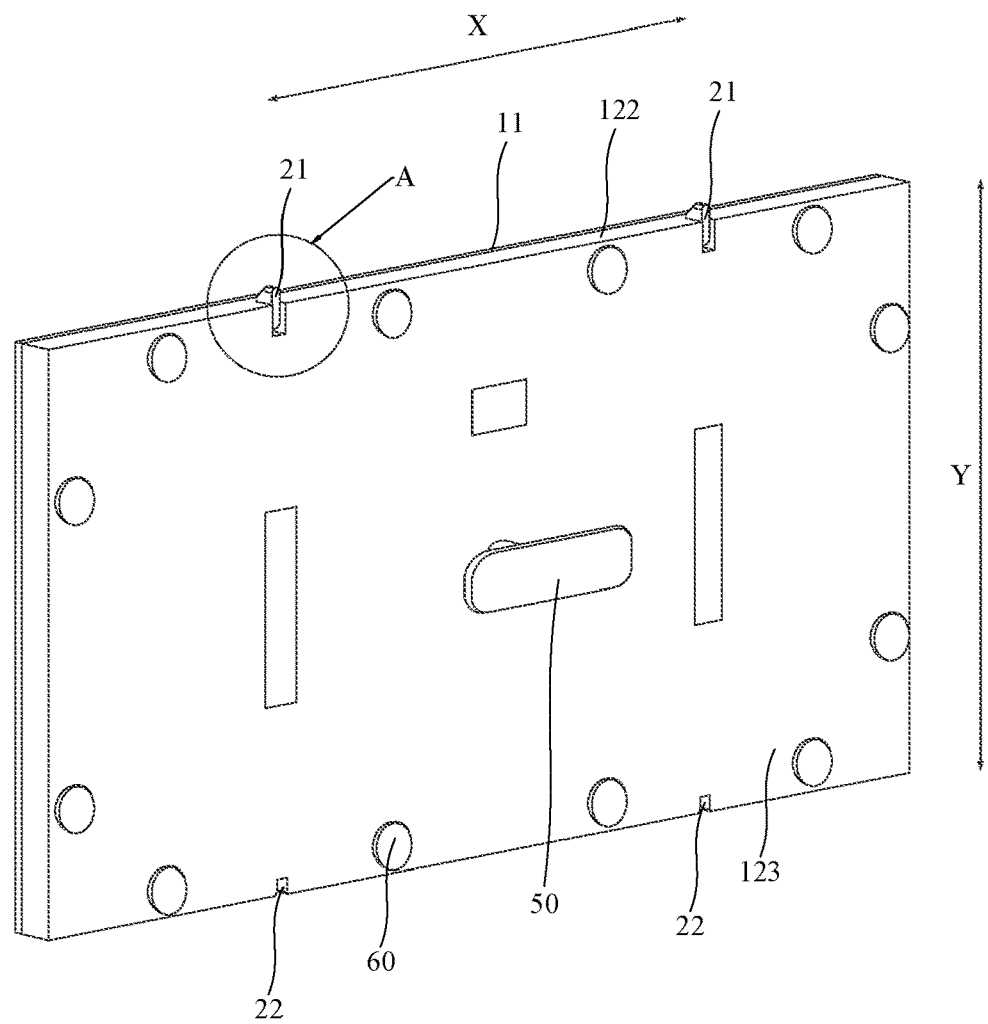
FIG. 2 is a partial perspective view of the structure of the spliced display screen in another direction according to an embodiment of the present disclosure.
Figure 3:
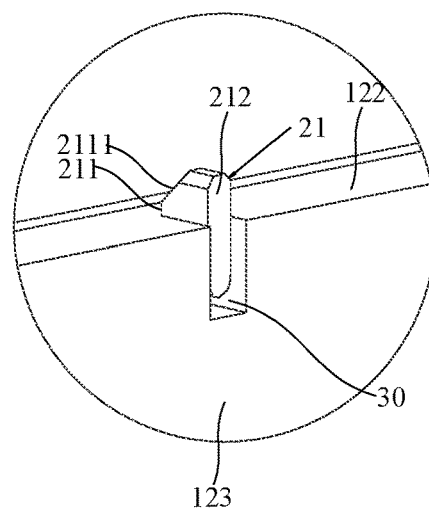
FIG. 3 is a partial enlarged view of portion A in FIG. 2.
Figure 4:
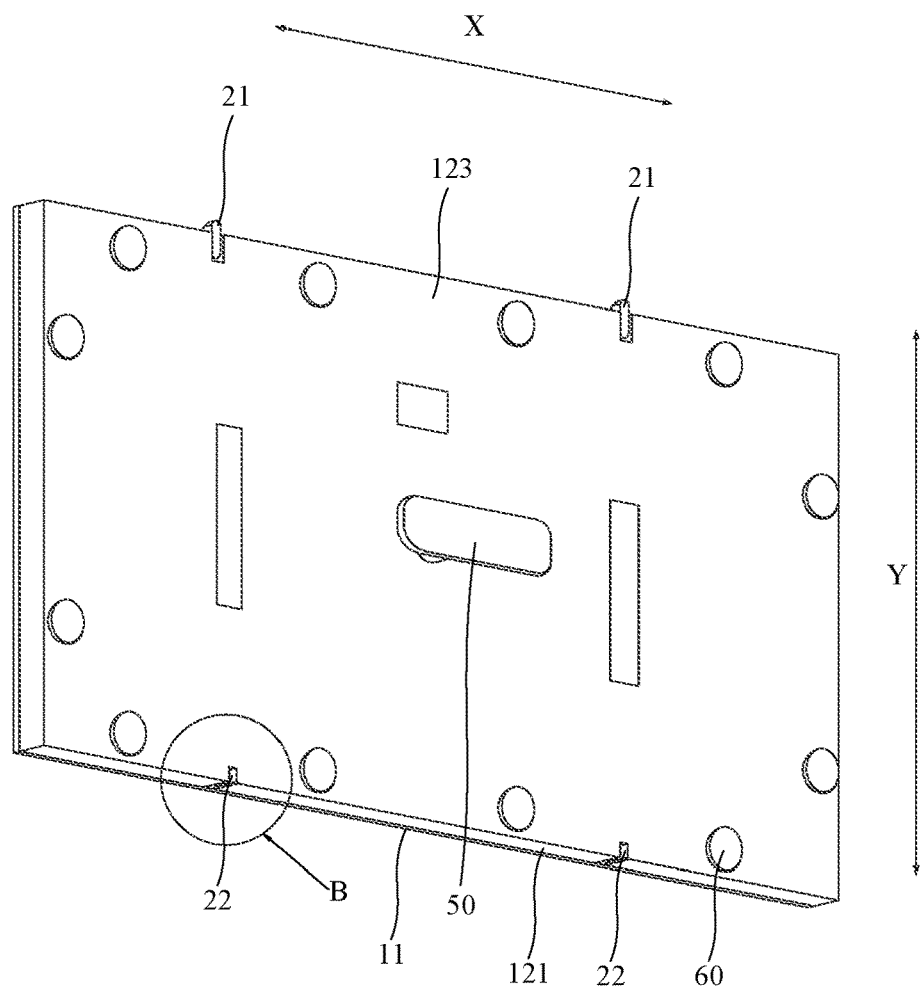
FIG. 4 is a partial perspective view of the structure of the spliced display screen in yet another direction according to an embodiment of the present disclosure.
Figure 5:
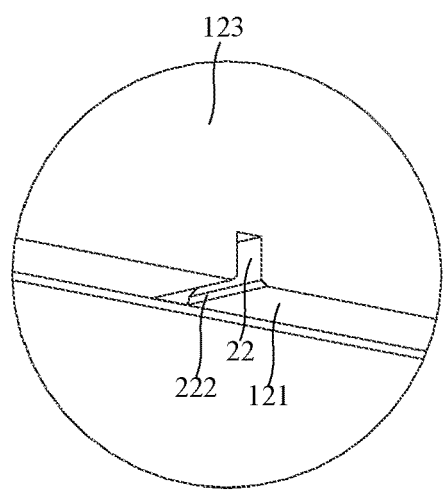
FIG. 5 is a partial enlarged view of portion B in FIG. 4.

Examples will be described in detail herein, with the illustrations thereof represented in the drawings. When the following descriptions involve the drawings, same numbers in different drawings refer to same or similar elements unless otherwise indicated. The embodiments described in the following examples do not represent all embodiments consistent with the present disclosure. Rather, they are merely examples of apparatuses consistent with some aspects of the present disclosure as detailed in the appended claims.

The terms used herein are only used for the purpose of describing particular examples and not intended to limit the present disclosure. Unless otherwise stated, the technical terms or scientific terms used herein should have general meanings that could be understood by ordinary persons skilled in the art. The words "one" and "a" and the like also do not represent limitation of number but represent existence of at least one. The words "including" or "comprising" and the like are intended to refer to that an element or an article appearing before the "including" or "comprising" covers listed elements or articles and its equivalents appearing after the "including" or "comprising", and does not exclude other elements or articles. The words "connect" or "couple" and the like are not limited to physical or mechanical connection, and may be an electrical connection, whether directly or indirectly. "A plurality" represents two or more. The words "a", "the" and "said" in their singular forms in the present disclosure and the appended claims are also intended to include plurality, unless clearly indicated otherwise in the context. It should also be understood that the term "and/or" as used herein refers to and includes any and all possible combinations of one or more of the associated listed items.

During installing a spliced display screen, the splicing misalignment of adjacent display modules may cause pixel dislocation, which may lead to the deterioration of display effect, especially for display modules with a pixel pitch below 1.5 mm (below P1.5).

In the current solution, 4-6 display modules are fixed on a box body to achieve more accurate assembly and positioning, and can be disassembled and maintained. The box body and the box body are connected and fixed by a bolt or a lock, so as to achieve a larger area of the splicing display.

The box body is generally made of aluminum die-casting with Computerized Numerical Control (CNC) due to the high demands for machining accuracy, and the cost is high. In a large number of indoor scenarios, during the actual installation and deployment process, in order to save costs, the box body is usually not used and the display module is directly fixed to a prefabricated steel frame on a wall by magnetic attraction.

This simple installation method is not suitable for small-pitch (below P1.5) spliced display screens due to the relatively inaccurate alignment. At present, the deployment of the small-pitch spliced display screens still adopt a combination of modules and box body.

With reference to FIGS. 1-10, FIGS. 11A-11B and FIGS. 18A-18B, an embodiment of the present disclosure provides a spliced display screen. The spliced display screen includes a plurality of display modules 10 arranged closely and one or more positioning mechanisms 20 installed on each of the display modules 10.

Each of the positioning mechanisms 20 includes a positioning pin 21, a groove 22 and an elastic structure 23.

The positioning pin 21 and the groove 22 are respectively and correspondingly arranged on two ends of the display module 10 along a vertical direction Y. For any two display modules 10 adjacent along the vertical direction Y: the positioning pin 21 on one of the two display modules 10 can be clamped in the groove 22 on the other of the two display modules 10, and the positioning pin 21 and the groove 22 engage to restrict relative movement of the two display modules 10 along a horizontal direction X, so as to ensure that there is no or basically no dislocation in the horizontal direction X between the two display modules 10 adjacent along the vertical direction Y.

A shape and a size of the groove 22 are matched with those of the positioning pin 21, so that the positioning pin 21 can be better clamped/fitted in the groove 22. The present disclosure does not limit the shapes and sizes of the groove 22 and the positioning pin 21.

The elastic structure 23 is arranged corresponding to the positioning pin 21, and one end of the elastic structure 23 is connected to the display module 10 and the other end of the elastic structure 23 is connected to the positioning pin 21.

When the positioning pin 21 is subjected to an external force, the positioning pin 21 can be caused to rotate along a predetermined direction D relative to the groove 22 and leave the groove 22. When the positioning pin 21 is disengaged from the external force, the positioning pin 21 returns to an initial position along a direction opposite to the predetermined direction D with the assistance of the elastic structure 23.

The display module 10 includes a display panel 11 and a bottom shell 12 fixed to a backlight surface of the display panel 11. The bottom shell 12 includes a first surface 121 and a second surface 122 which are opposite along the vertical direction Y, and a bottom surface 123 connecting the first surface 121 and the second surface 122. The groove 22 is arranged on the first surface 121. The positioning pin 21 and the elastic structure 23 are both arranged on the second surface 122 at a position corresponding to the groove 22. The first surface 121 may be located above or below the second surface 122 in the vertical direction Y, which is not limited here.

Figure 6:
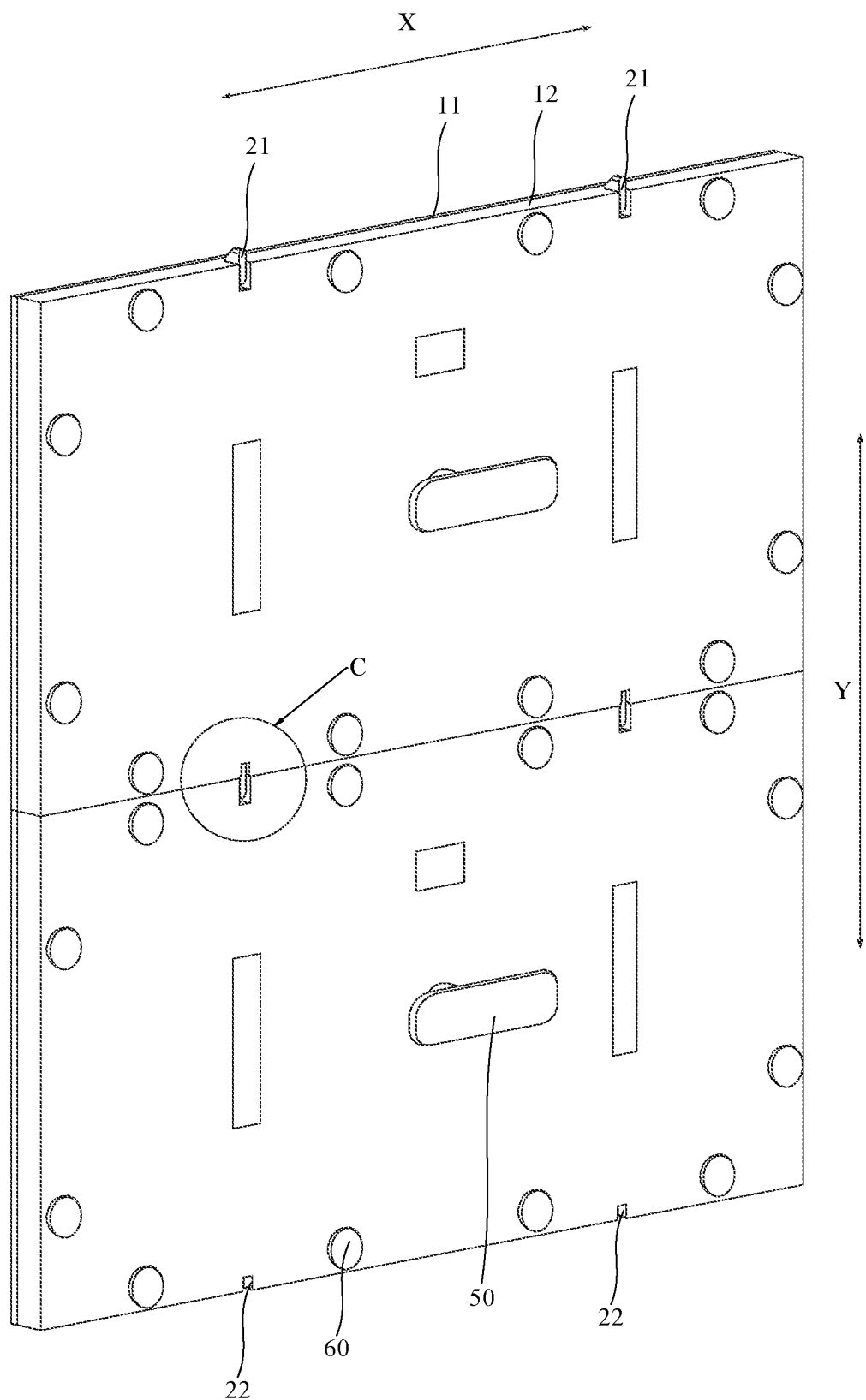
FIG. 6 is a perspective view of a structure obtained by fixing two adjacent display modules together through a positioning mechanism according to an embodiment of the present disclosure.
Figure 7:
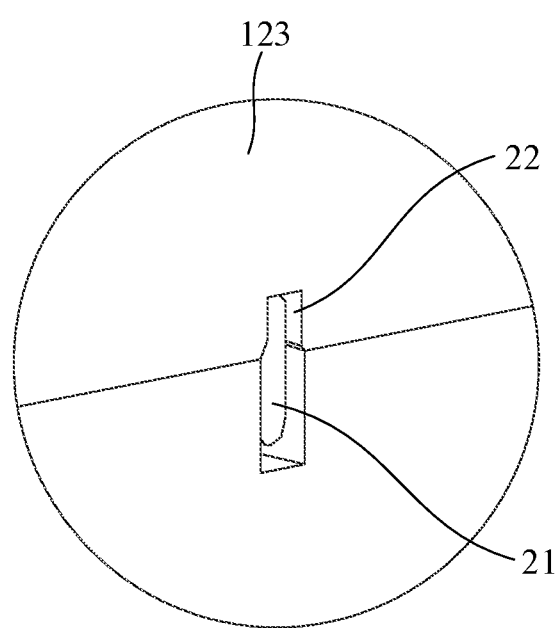
FIG. 7 is a partial enlarged view of portion C in FIG. 6.

Please refer to FIG. 6 and FIG. 7. Since the structure of each display module 10 is the same, for two display modules 10 adjacent along the vertical direction Y, the groove 22 on the first surface 121 of the upper display module 10 engages with the positioning pin 21 on the second surface 122 of the lower display module 10 to fix the two adjacent display modules 10.

The groove 22 includes a first opening 221, and one end of the positioning pin 21 is clamped in the groove 22 through the first opening 221. The first opening 221 is opened on the first surface 121. A guiding inclined surface 222 is arranged on one end of a side wall of the groove 22 near the first opening 221, so as to guide the positioning pin 21 corresponding to the groove 22 when fixing two adjacent display modules 10.

The groove 22 further includes a second opening 223. The second opening 223 is communicated with the first opening 221 and is opened on a side wall of the groove 22. When the positioning pin 21 is located in the groove 22, the second opening 223 is arranged behind the positioning pin 21 along the predetermined direction D, that is, the second opening 223 is opened on the bottom surface 123. In this way, by providing the second opening 223, the space occupied by the groove 22 can be greatly reduced.

An accommodating cavity 30 with one end including a third opening 31 is arranged in the display module 10, and the third opening 31 is opened on the second surface 122.

The elastic structure 23 is arranged at a bottom of the accommodating cavity 30, the positioning pin 21 is partially located in the accommodating cavity 30 through the third opening 31, and the positioning pin 21 is located above the elastic structure 23.

The positioning pin 21 sequentially includes a first side surface 211 and a second side surface 212 along the predetermined direction D. The first side surface 211 and the second side surface 212 are oppositely arranged, and a partial side surface of the first side surface 211 close to one end away from the accommodating cavity 30 is an inclined surface 2111 inclined toward the predetermined direction D. In this way, when the positioning pin 21 is caused to rotate along the predetermined direction D, by providing the inclined surface 2111, the positioning pin 21 can be separated from the groove 22 when the rotation angle is as small as possible. In an example, the first side 211 may not include the inclined surface 2111.

The accommodating cavity 30 further includes a fourth opening 32. The fourth opening 32 is communicated with the third opening 31 and is opened on a side wall of the accommodating cavity 30. The fourth opening 32 is arranged behind the positioning pin 21 along the predetermined direction D, that is, the fourth opening 32 is opened on the bottom surface 123. In this way, by providing the fourth opening 32, the space occupied by the accommodating cavity 30 can be greatly reduced.

One end of the positioning pin 21 located in the accommodating cavity 30 is pivotally connected to a side wall of the accommodating cavity 30 through a rotating shaft 40.

In the embodiment, the display module 10 further includes a handle 50. The handle 50 is disposed on a surface of the bottom shell 12 away from the display panel 11.

The spliced display screen further includes a support frame 90 and one or more attracting assemblies, and the attracting assembly on a display panel includes one or more first attracting components 60 and one or more second attracting components 70. The first attracting components 60 and the second attracting components 70 may be magnets, but are not limited to this, and may alternatively be other components capable of attracting and coupling with each other.

The first attracting components 60 are arranged on a surface of the bottom shell 12 of the display module 10 away from the display panel 11, that is, the bottom surface 123. The second attracting components 70 are arranged on the support frame 90 at positions corresponding to the first attracting components 60. The first attracting components 60 and the second attracting components 70 are attracted and coupled to fix the plurality of display module 10 on the support frame 90.

The working principle of the positioning mechanism 20 of the embodiment is as follows.

Figure 8:
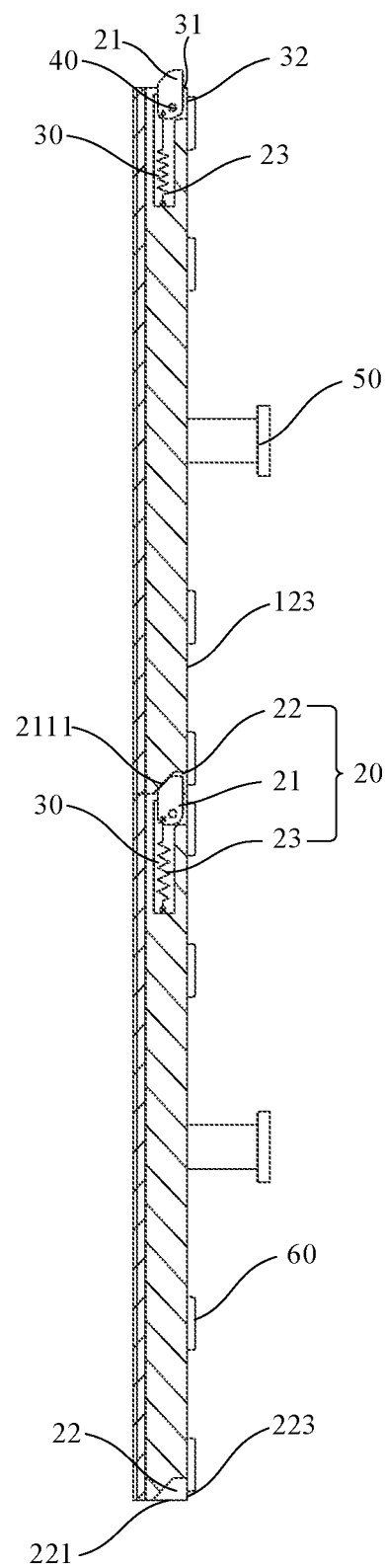
FIG. 8 is a schematic cross-sectional view of a structure obtained by clamping a positioning pin in a groove according to an embodiment of the present disclosure.

Please refer to FIG. 8. When installing the spliced display screen, two display modules 10 adjacent along the vertical direction Y are fixed together by clamping the positioning pin 21 in the groove 22, so that the positioning pin 21 is located at the initial position.

Figure 9:
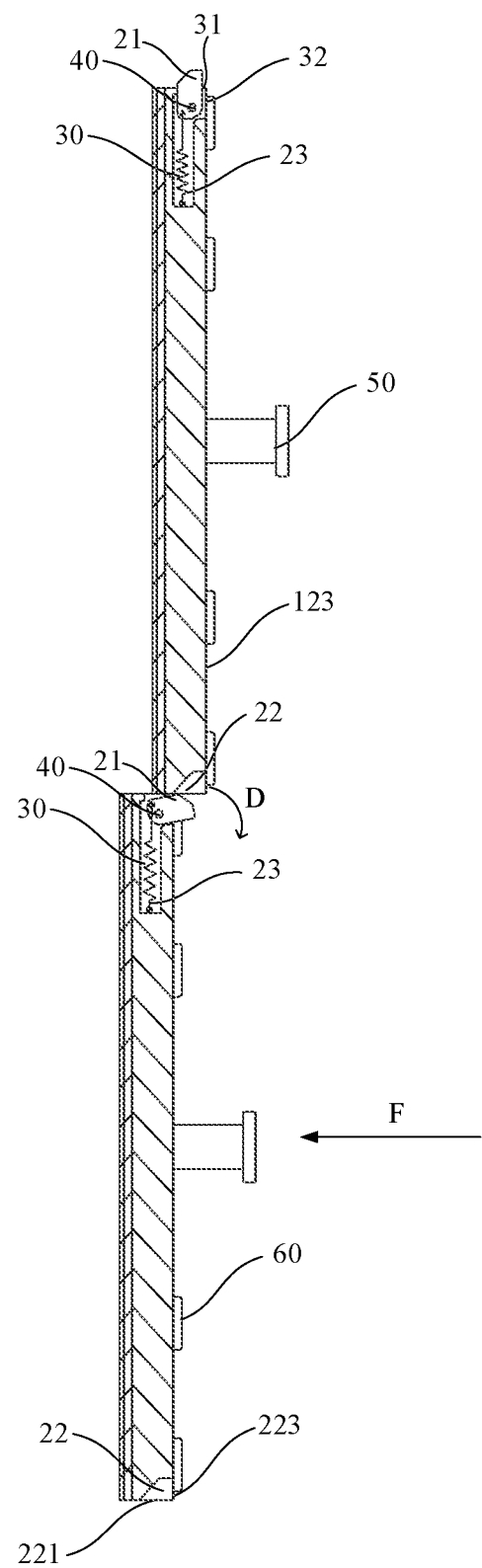
FIG. 9 is a schematic cross-sectional view of a structure obtained in a process of the positioning pin being caused to leave the groove according to an embodiment of the present disclosure.

Please refer to FIG. 9. When one of the two adjacent display modules 10 is to be maintained, the to-be-maintained display module 10 is to be disassembled from the entire spliced display screen. At this time, hold the handle 50 and apply a force F to the to-be-maintained display module 10, so that the to-be-maintained display module 10 is pushed out of the plane where the entire spliced display screen is located. In the process, the positioning pin 21 is caused to rotate along the predetermined direction D and gradually leave the groove 22.

Figure 10:
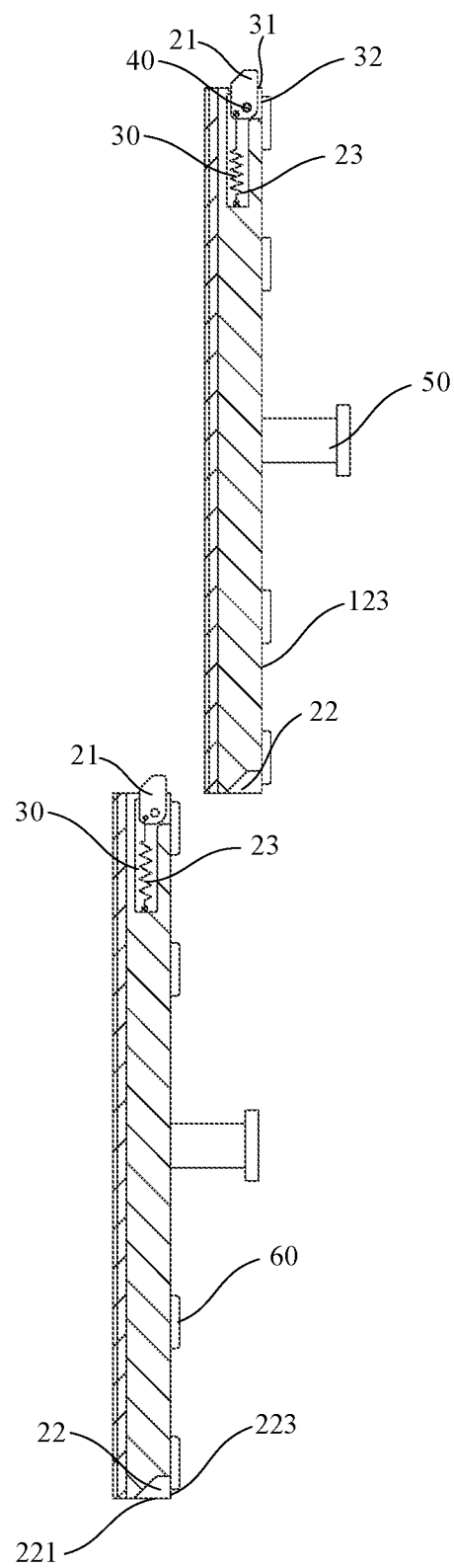
FIG. 10 is a schematic cross-sectional view of a structure obtained after the positioning pin is detached from the groove according to an embodiment of the present disclosure.

Please refer to FIG. 10. When the to-be-maintained display module 10 is completely removed, that is, when the positioning pin 21 is disengaged from the external force, the positioning pin 21 returns to the initial position along a direction opposite to the predetermined direction D with the assistance of the elastic structure 23.

Figure 11A:
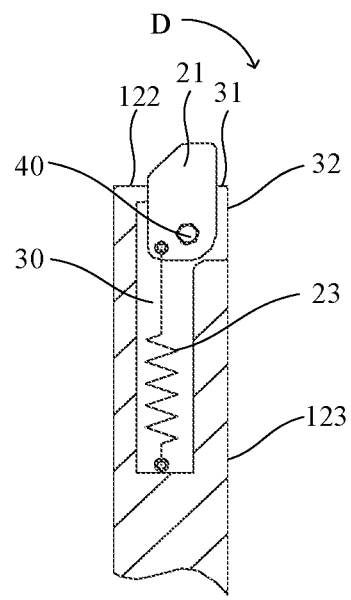
FIGS. 11A-11B are schematic diagrams illustrating the working principle of an elastic structure and a positioning pin cooperating with each other according to an embodiment of the present disclosure.
Figure 11B:
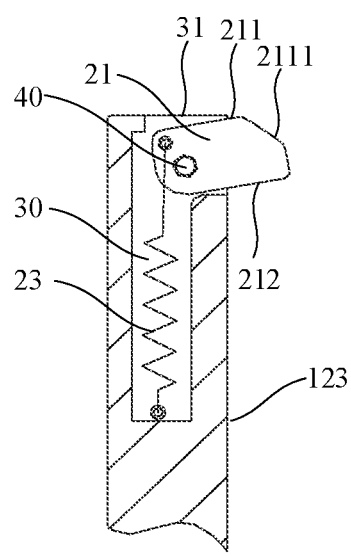

Please refer to FIGS. 11A-11B, which illustrate that the elastic structure 23 cooperates with the positioning pin 21. The elastic structure 23 is a tension spring. One end of the elastic structure 23 is fixed in the accommodating cavity 30 and the other end of the elastic structure 23 is fixed on the positioning pin 21. Under the action of external force, the positioning pin 21 rotates along the predetermined direction D, so that the elastic structure 23 is stretched. Finally the positioning pin 21 is inclined, the second side surface 212 abuts against the bottom surface 123, and the highest point of the positioning pin 21 is flush with or lower than the second surface 122, as shown in FIG. 11B. After the positioning pin 21 is disengaged from the external force, the elastic structure 23 is restored to its original state, thus driving the positioning pin 21 to return to its original position, as shown in FIG. 11A.

Figure 12A:
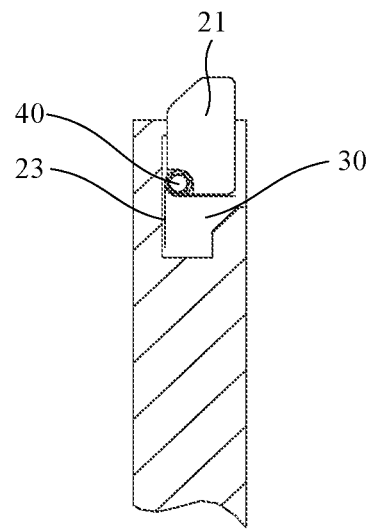
FIGS. 12A-12B are schematic diagrams illustrating another working principle of the elastic structure and the positioning pin cooperating with each other according to an embodiment of the present disclosure.
Figure 12B:
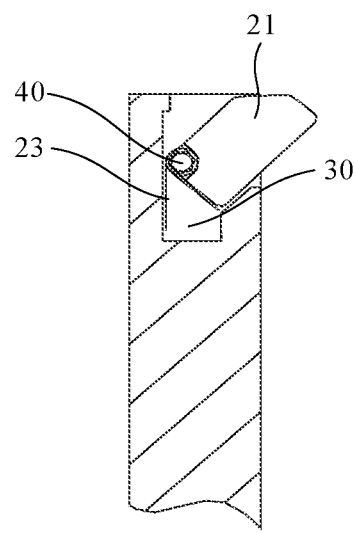

In another embodiment, as shown in FIGS. 12A-12B, the elastic structure 23 is a torsion spring. One end of the elastic structure 23 is fixed in the accommodating cavity 30, and the other end of the elastic structure 23 is twisted and sleeved on the rotating shaft 40, and the rotating shaft 40 is fixedly connected with the positioning pin 21. Under the action of external force, the positioning pin 21 rotates along the predetermined direction D, so that the elastic structure 23 is twisted. Finally the positioning pin 21 is inclined, the second side surface 212 abuts against the bottom surface 123, and the highest point of the positioning pin 21 is flush with or lower than the second surface 122, as shown in FIG. 12B. After the positioning pin 21 is disengaged from the external force, the elastic structure 23 is restored to its original state, thus driving the positioning pin 21 to return to its original position, as shown in FIG. 12A.

Figure 13A:
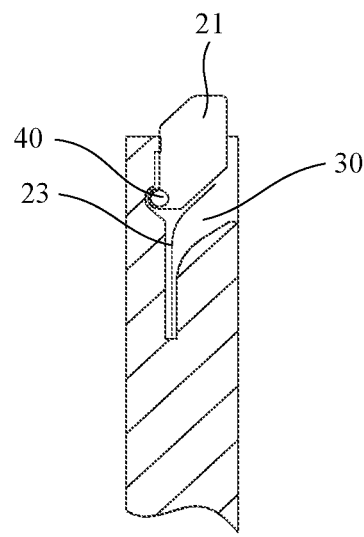
FIGS. 13A-13B are schematic diagrams illustrating another working principle of the elastic structure and the positioning pin cooperating with each other according to an embodiment of the present disclosure.
Figure 13B:
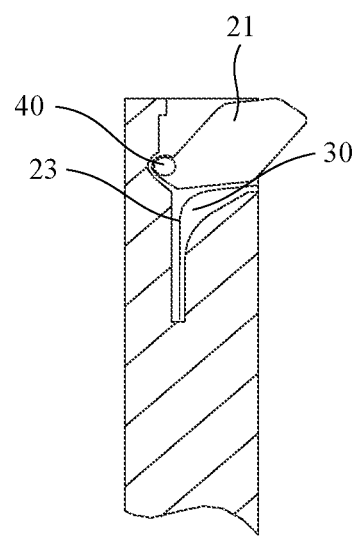

In another embodiment, as shown in FIGS. 13A-13B, the elastic structure 23 is a leaf spring. One end of the elastic structure 23 is fixed in the accommodating cavity 30, and the other end of the elastic structure 23 is pressed on the positioning pin 21. Under the action of external force, the positioning pin 21 rotates along the predetermined direction D, so that the elastic structure 23 is bent, and the positioning pin 21 is inclined with the elastic structure 23, and the highest point of the positioning pin 21 can be flush with or lower than the second surface 122, as shown in FIG. 13B. After the positioning pin 21 is disengaged from the external force, the elastic structure 23 is restored to its original state, thus driving the positioning pin 21 to return to its original position, as shown in FIG. 13A.

The spliced display screen in the embodiments is provided with a positioning mechanism 20, which can greatly simplify the structure of the spliced display screen on the basis of ensuring accurate splicing and alignment, so that the box body for the spliced display screen is no longer a necessary component for installing the small-pitch spliced display screen, thus effectively reducing the deployment cost of the small-pitch spliced display screen in many scenarios, and greatly simplifying the assembly steps of the spliced display screen. During assembly, the upper display module 10 can be directly fixed to the lower display module 10 through the direct clamp of the positioning mechanism 20. Furthermore, by providing the positioning mechanism 20, the to-be-maintained display module 10 can be simply and quickly disassembled from the entire spliced display screen.

Another embodiment of the present disclosure provides a spliced display screen. The structure of the spliced display screen is basically the same as the spliced display screen in the previous embodiment, and the difference lies in: the arranged locations of the positioning pin 21 and the elastic structure 23 in this embodiment are different from those of the positioning pin 21 and the elastic structure 23 in the previous embodiment.

Figure 14:
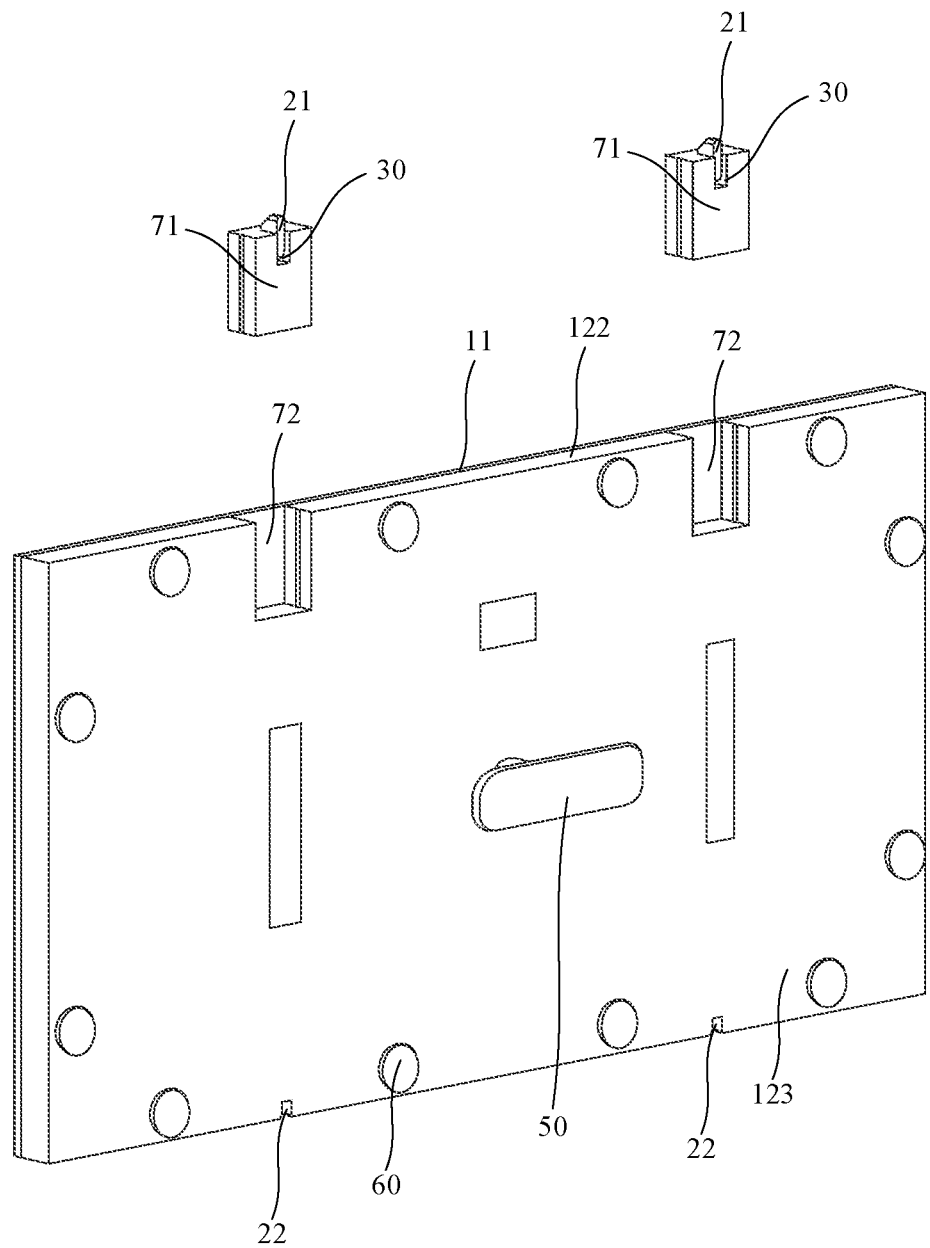
FIG. 14 is a partial exploded perspective view of a structure of a spliced display screen according to another embodiment of the present disclosure.
Figure 15:
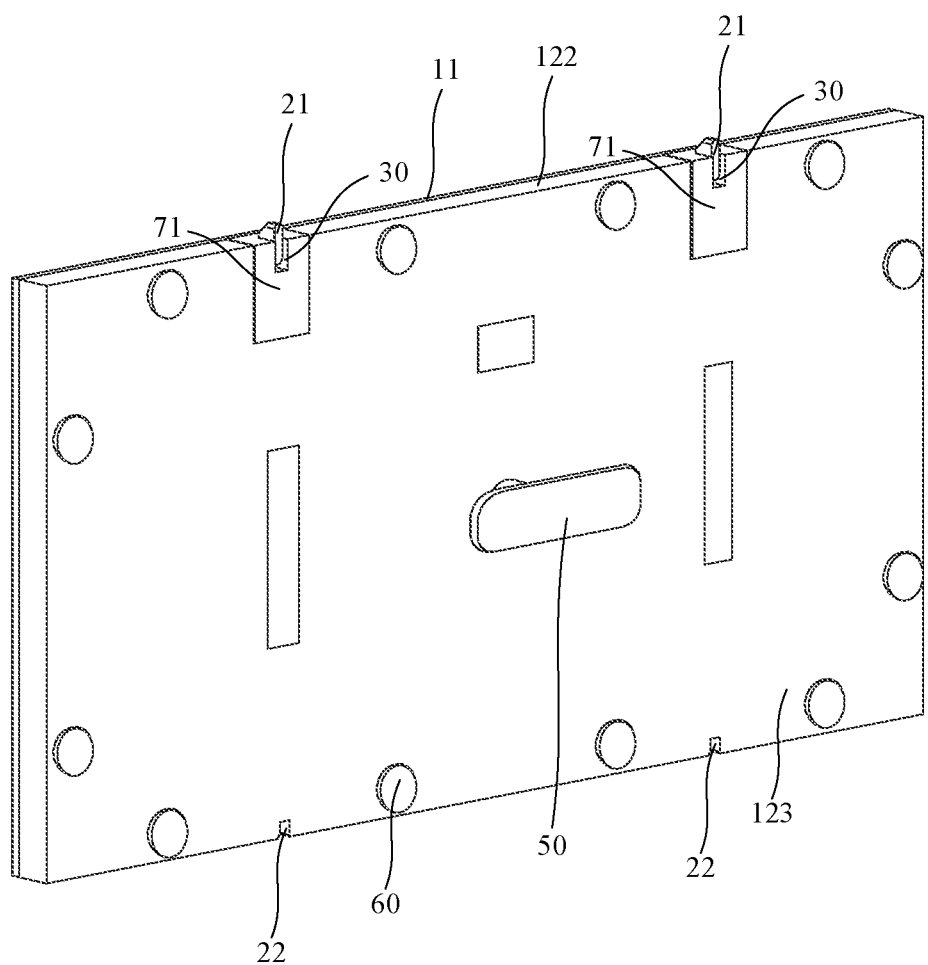
FIG. 15 is a partially perspective view of a spliced display screen according to an embodiment of the present disclosure.

As shown in FIGS. 14 and 15, the positioning mechanism 20 further includes a fixing block 71, and the positioning pin 21 and the elastic structure 23 are both arranged on the fixing block 71. An installation groove 72 is arranged in the second surface 122, and the fixing block 71 is slidably arranged in the installation groove 72.

It should be noted that the accommodating cavity 30 is configured to accommodate the positioning pin 21 and the elastic structure 23, and accordingly, the accommodating cavity 30 is also arranged on the fixing block 71.

In the embodiment, by providing the fixing block 71, the positioning pin 21 and the elastic structure 23 can be conveniently detached from the display module 10, which facilitates the maintenance of the positioning pin 21 and the elastic structure 23.

Another embodiment of the present disclosure provides a spliced display screen. The structure of the spliced display screen is basically the same as the spliced display screen in the embodiment corresponding to FIGS. 1-13, and the difference lies in: the groove 22, the positioning pin 21 and the elastic structure 23 are arranged in different positions.

Figure 16:
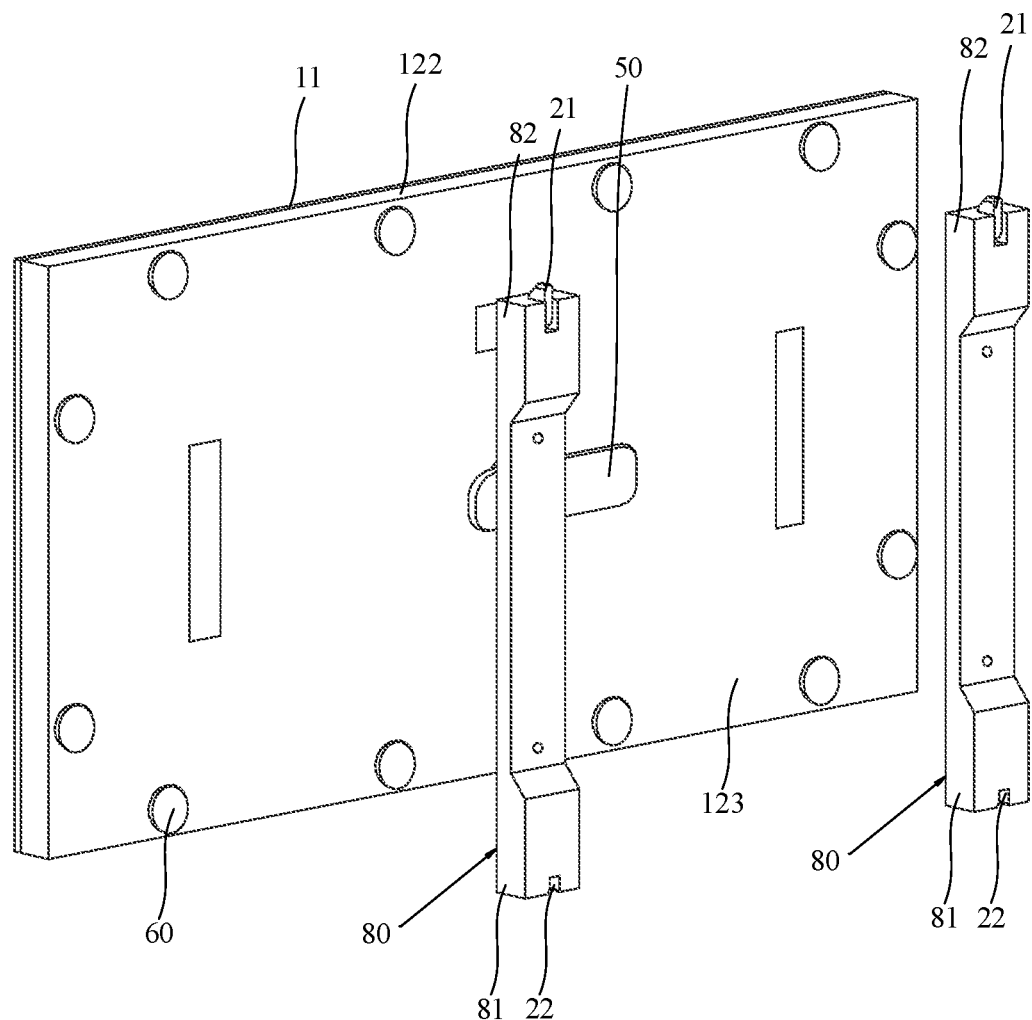
FIG. 16 is a partial exploded perspective view of a structure of a spliced display screen according to another embodiment of the present disclosure.
Figure 17:
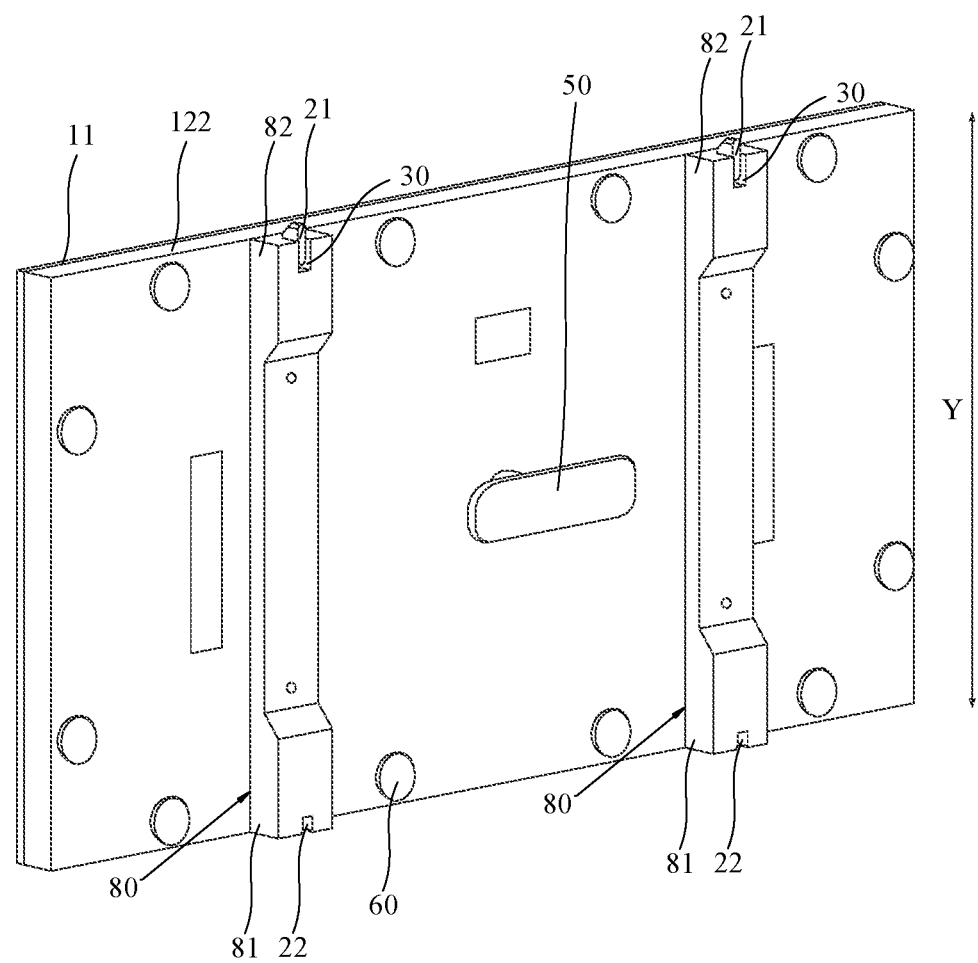
FIG. 17 is a partially perspective view of a spliced display screen according to another embodiment of the present disclosure.
Figure 18A:
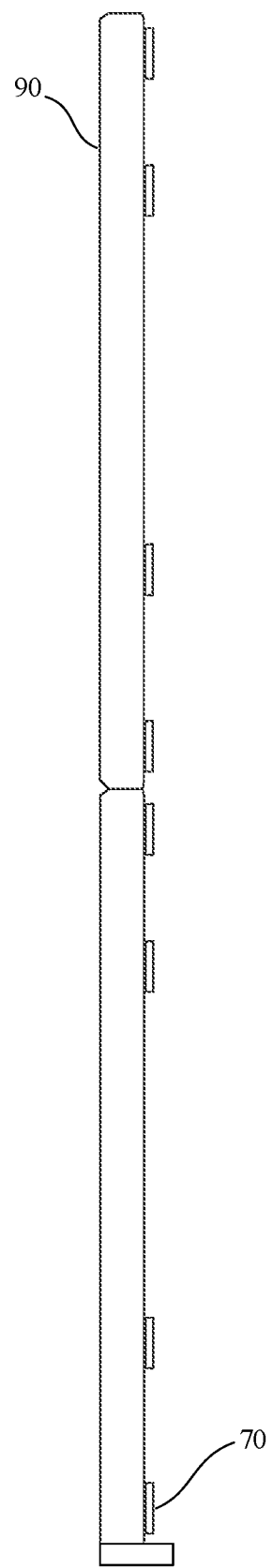
FIG. 18A is a partial perspective view of a structure of a support frame according to an embodiment of the present disclosure.
Figure 18B:
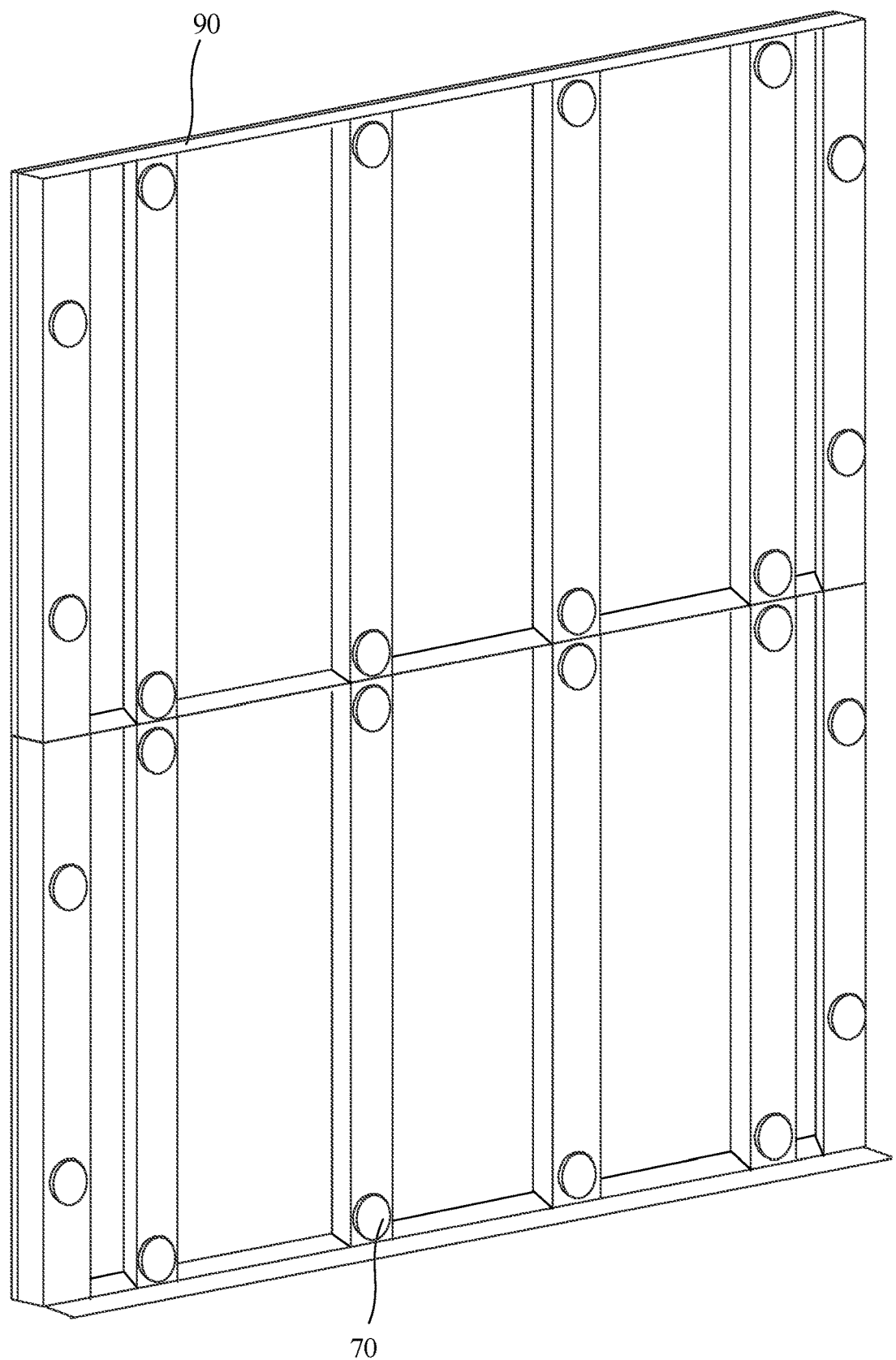
FIG. 18B is a partial perspective view of the structure of a support frame in another direction according to an embodiment of the present application.

As shown in FIGS. 16 and 17, the positioning mechanism 20 further includes a fixing base 80. The fixing base 80 is detachably fixed on a surface of the bottom shell 12 away from the display panel 11, that is, fixed on the bottom surface 123 of the bottom shell 12.

The fixing base 80 includes a first end 81 and a second end 82 which are opposite along the vertical direction Y. The groove 22 is arranged on the first end 81 of the fixing base 80. The positioning pin 21 and the elastic structure 23 are both arranged on the second end 82 of the fixing base 80 corresponding to the groove 22.

It should be noted that the accommodating cavity 30 is configured to accommodate the positioning pin 21 and the elastic structure 23, and accordingly, the accommodating cavity 30 is also arranged on the second end 82 of the fixing base 80.

In this way, by providing the fixing base 80, the positioning mechanism 20 can be conveniently detached from the display module 10 as a whole, thereby facilitating the maintenance of various components of the positioning mechanism 20.

For the spliced display screen provided by the embodiments of the present disclosure, the structure and assembly steps are greatly simplified on the basis of ensuring accurate splicing and alignment. And the to-be-maintained display module can be easily and quickly detached from the entire spliced display screen.

It should be noted that, although each figure shows that two sets of positioning structures are installed on one display module, one or more than two sets of positioning mechanisms can be installed on one display module as needed.

The above are merely preferred embodiment of the present disclosure, and are not intended to limit the present disclosure. Any amendments, equivalent substitutions, improvements, etc. made within the spirit and principles of the present disclosure shall be included in the scope of protection of the present disclosure.

What is claimed is:
1. A spliced display screen, comprising:
a plurality of display modules arranged closely, and
one or more positioning mechanisms installed on each of the display modules, wherein each of the positioning mechanisms comprises:
a positioning pin and a groove which are respectively and correspondingly arranged on two ends of the display module along a vertical direction;
an elastic structure arranged corresponding to the positioning pin, one end of the elastic structure being connected to the display module and the other end of the elastic structure being connected to the positioning pin;

wherein, for any two display modules adjacent along the vertical direction, the one or more positioning pins on one of the two display modules are clamped in the one or more grooves on the other of the two display modules, and the one or more positioning pins and the one or more grooves cooperate to restrict relative movement of the two display modules along a horizontal direction;

in response to being subjected to an external force, the one or more positioning pins rotate along a predetermined direction relative to the one or more grooves and leave the one or more grooves;

in response to being disengaged from the external force, the one or more positioning pins return to an initial position along a direction opposite to the predetermined direction through the respective elastic structures.

2. The spliced display screen according to claim 1, wherein for each of the positioning mechanisms, a shape and a size of the groove are matched with those of the positioning pin.

3. The spliced display screen according to claim 1, wherein for each of the positioning mechanisms, the groove comprises a first opening, and one end of the positioning pin of an adjacent positioning mechanism is clamped in the groove through the first opening.

4. The spliced display screen according to claim 3, wherein the groove further comprises a second opening which is communicated with the first opening and opened on a side wall of the groove, and the second opening is arranged behind the positioning pin of the adjacent positioning mechanism along the predetermined direction.

5. The spliced display screen according to claim 1, wherein an accommodating cavity with one end comprising a third opening is arranged on the display module, the elastic structure is arranged at a bottom of the accommodating cavity, the positioning pin is partially located in the accommodating cavity through the third opening, and the positioning pin is located above the elastic structure.

6. The spliced display screen according to claim 1, wherein the positioning pin sequentially comprises a first side surface and a second side surface along the predetermined direction, the first side surface and the second side surface are oppositely arranged, and a partial side surface of the first side surface close to one end away from the accommodating cavity is an inclined surface inclined toward the predetermined direction.

7. The spliced display screen according to claim 5, wherein the accommodating cavity further comprises a fourth opening which is communicated with the third opening and opened on a side wall of the accommodating cavity, and the fourth opening is arranged behind the positioning pin along the predetermined direction.

8. The spliced display screen according to claim 5, wherein one end of the positioning pin located in the accommodating cavity is pivotally connected to a side wall of the accommodating cavity through a rotating shaft.

9. The spliced display screen according to claim 1, wherein,
the display module comprises a display panel and a bottom shell fixed on a backlight surface of the display panel, the bottom shell comprises a first surface and a second surface which are opposite along the vertical direction; and for each of the positioning mechanisms, the groove is arranged on the first surface; the positioning pin and the elastic structure are both arranged on the second surface corresponding to the groove.

10. The spliced display screen according to claim 9, wherein the display module further comprises a handle disposed on a surface of the bottom shell away from the display panel.

11. The spliced display screen according to claim 9, further comprising a support frame and a plurality of attracting assemblies provided on the plurality of display modules respectively, wherein each of the attracting assemblies comprises one or more first attracting components and one or more second attracting components;
for each of the display modules, the first attracting components are arranged on a surface of the bottom shell of the display module away from the display panel; the second attracting components are arranged on the support frame corresponding to the first attracting components, and the first attracting components and the second attracting components are attracted and coupled to fix the display module on the support frame.

12. The spliced display screen according to claim 1, wherein,
the display module comprises a display panel and a bottom shell fixed on a backlight surface of the display panel, the bottom shell comprises a first surface and a second surface which are opposite along the vertical direction;
for each of the positioning mechanisms, the groove is arranged on the first surface; the positioning mechanism further comprises a fixing block, and the positioning pin and the elastic structure are both arranged in the fixing block;
an installation groove is arranged on the second surface, and the fixing block is slidably arranged in the installation groove.

13. The spliced display screen according to claim 12, wherein the display module further comprises a handle disposed on a surface of the bottom shell away from the display panel.

14. The spliced display screen according to claim 12, further comprising a support frame and a plurality of attracting assemblies provided on the plurality of display modules respectively, wherein each of the attracting assemblies comprises one or more first attracting components and one or more second attracting components;
for each of the display modules, the first attracting components are arranged on a surface of the bottom shell of the display module away from the display panel; the second attracting components are arranged on the support frame corresponding to the first attracting components, and the first attracting components and the second attracting components are attracted and coupled to fix the display module on the support frame.

15. The spliced display screen according to claim 1, wherein,
the display module comprises a display panel and a bottom shell fixed on a backlight surface of the display panel;
the positioning mechanism further comprises a fixing base which is detachably fixed on a surface of the bottom shell away from the display panel, and the fixing base comprises a first end and a second end which are opposite along the vertical direction;

the groove is arranged on the first end of the fixing base; the positioning pin and the elastic structure are both arranged on the second end of the fixing base corresponding to the groove.

16. The spliced display screen according to claim 15, wherein the display module further comprises a handle disposed on a surface of the bottom shell away from the display panel.

17. The spliced display screen according to claim 15, further comprising a support frame and a plurality of attracting assemblies provided on the plurality of display modules respectively, wherein each of the attracting assemblies comprises one or more first attracting components and one or more second attracting components;

for each of the display modules, the first attracting components are arranged on a surface of the bottom shell of the display module away from the display panel; the second attracting components are arranged on the support frame corresponding to the first attracting components, and the first attracting components and the second attracting components are attracted and coupled to fix the display module on the support frame.

* * * * *